US006966388B1

(12) United States Patent
Harnetiaux et al.

(10) Patent No.: US 6,966,388 B1
(45) Date of Patent: Nov. 22, 2005

(54) OFFSET HITCH

(75) Inventors: Travis Lester Harnetiaux, Woodridge, IL (US); Charles A. Johnson, Serena, IL (US)

(73) Assignee: CNH America LLC, Racine, WI (US)

( * ) Notice: Subject to any disclaimer, the term of this patent is extended or adjusted under 35 U.S.C. 154(b) by 10 days.

(21) Appl. No.: 10/862,650

(22) Filed: Jun. 7, 2004

(51) Int. Cl.$^7$ .............................................. A01B 59/00
(52) U.S. Cl. ...................................... 172/679; 172/677
(58) Field of Search .................................. 172/677, 679; 280/180

(56) References Cited

U.S. PATENT DOCUMENTS

| | | | |
|---|---|---|---|
| 1,601,797 A | * | 10/1926 | Hansmann et al. ......... 172/256 |
| 1,812,049 A | * | 6/1931 | Johnson ....................... 280/472 |
| 1,918,382 A | * | 7/1933 | Cook ........................... 172/677 |
| 2,022,701 A | * | 12/1935 | Wright ......................... 172/678 |
| 2,386,053 A | * | 10/1945 | McElhinney ................ 280/504 |
| 2,438,553 A | * | 3/1948 | Fraga .......................... 172/459 |
| 2,576,351 A | * | 11/1951 | Milton ......................... 172/573 |
| 2,600,642 A | * | 6/1952 | Hagedorn .................... 280/467 |
| 2,674,836 A | * | 4/1954 | Schulte ........................ 172/677 |
| 2,898,127 A | * | 8/1959 | Plumb ....................... 280/478.1 |
| 3,544,131 A | * | 12/1970 | Pennington .................. 280/412 |
| 3,922,006 A | * | 11/1975 | Borges ....................... 280/416.1 |
| 4,115,984 A | * | 9/1978 | Simpson ........................ 56/13.5 |
| 4,838,358 A | * | 6/1989 | Freudendahl ................ 172/125 |
| 5,641,026 A | * | 6/1997 | Balmer ......................... 172/452 |
| 5,660,409 A | * | 8/1997 | Hensley ..................... 280/455.1 |
| 6,237,823 B1 | * | 5/2001 | Stewart et al. .............. 224/509 |
| 6,837,510 B1 | * | 1/2005 | Karls ......................... 280/416.1 |

FOREIGN PATENT DOCUMENTS

GB 2322842 A * 9/1998 ............ B60D 1/07

* cited by examiner

Primary Examiner—Robert E. Pezzuto
Assistant Examiner—Alexandra K. Pechhold
(74) Attorney, Agent, or Firm—Rebecca Henkel; Brant T. Maurer

(57) ABSTRACT

A heavy gauge agricultural implement hitch is disclosed which is offset such that the implement and the tractor are not directly in line with one another, but allows the tractor to follow the previous crop rows and the implement to be offset of the previous crop rows. This offset of the hitch allows the implement to function with more ease, especially when the implement is a planter, thus making it possible to plant soybeans, for example, more easily in a field with corn stubble.

10 Claims, 4 Drawing Sheets

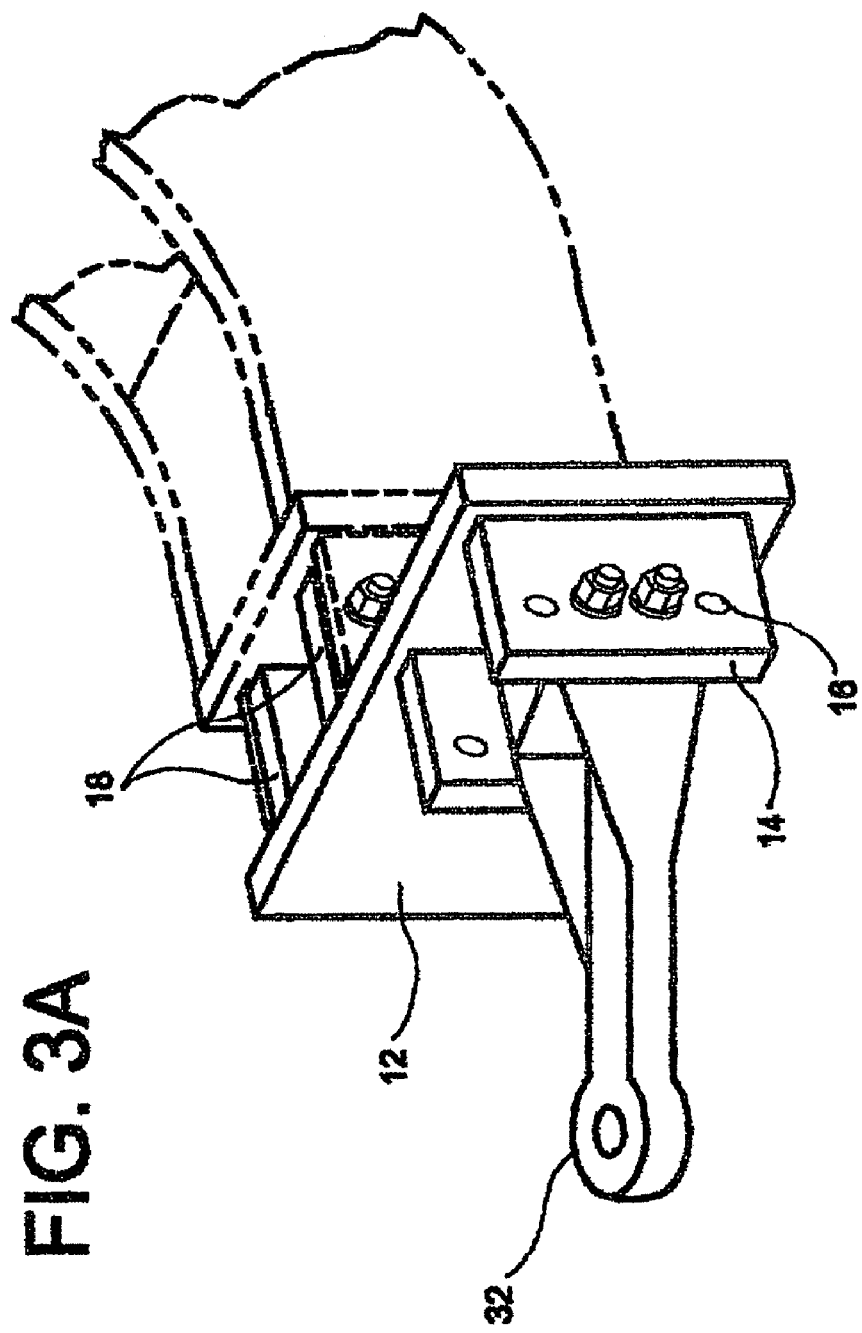

US 6,966,388 B1

OFFSET HITCH

BACKGROUND OF THE INVENTION

The present invention relates generally to an offset agricultural implement hitch that can be attached to an implement behind the tractor with the implement offset to one side of the tractor. The invention is particularly, but not exclusively designed for use in towing a planter, such that it is possible to plant soybeans or other crops in corn stubble (or other crop stubble) more easily.

It is well known that various implements can be towed behind a tractor. Normally, the attached implement is towed directly behind the tractor, providing an effective function since the implement can be simply pulled centrally and directly behind the tractor. However, it has been a long-standing problem in certain cropping practices to provide effective planting (or other crop related action) when the implement is pulled directly behind the tractor.

In many cases the tractor operator simply drives the tractor straight down the crop rows while pulling the implement directly behind the tractor. This can make it difficult for the implement to perform its designated function, since it would be aligning with and going directly over the old crop rows. These crop rows contain crop stubble and plant remnants from previous crops and harvests that impede the implement's performance on alternating rows.

It would be advantageous to provide a specifically designed hitch that offsets the implement from the tractor to allow for easier manipulation of the crop material while allowing the implement's components easier movement and performance of its designated function.

SUMMARY OF THE INVENTION

It is an object of the instant invention to provide an improved agricultural hitch that will offset the implement from the tractor.

It is another object of the instant invention to provide an offset of the implement from the tractor by about 7.5 inches to the left or right.

It is yet another object of the instant invention to provide an agricultural hitch that allows the implement to be attached to the hitch at various selectable vertical positions.

It is another object of the instant invention to provide an offset hitch that allows for easier manipulation of the implement's components (through) the crop material.

It is a further object of the instant invention to provide a rugged, yet economical offset hitch construction.

It is a further object of the instant invention to provide a hitch mechanism that enables easy coupling between implements and tractors.

It is a further object of the instant invention to provide a hitch that is able to run both the implement and the tractor to the side of the crop-stubble rows.

It is an even still further object of the instant invention to provide an offset hitch fabricated from a heavy steel plate to connect the implement to the tractor.

It is another object of the instant invention to provide a hitch that may be installed on existing equipment as a retrofit, or installed on new equipment.

It is a further object of the instant invention to provide an offset hitch that is durable in construction, inexpensive to manufacture, carefree of maintenance, facile in assemblage, and simple and effective in use.

These and other objects and features are obtained by providing a heavy gauge agricultural implement hitch is disclosed which is offset such that the implement and the tractor are not directly in line with one another, but allows the tractor to follow the previous crop rows and the implement to be slightly offset of the previous crop rows. This offset of the hitch allows the implement to function with more ease, especially when the implement is a planter, thus making it possible to plant soybeans, for example, more easily in a field with corn stubble.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3A is a front elevation perspective view of one embodiment of an offset hitch;

DETAILED DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the mechanism facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
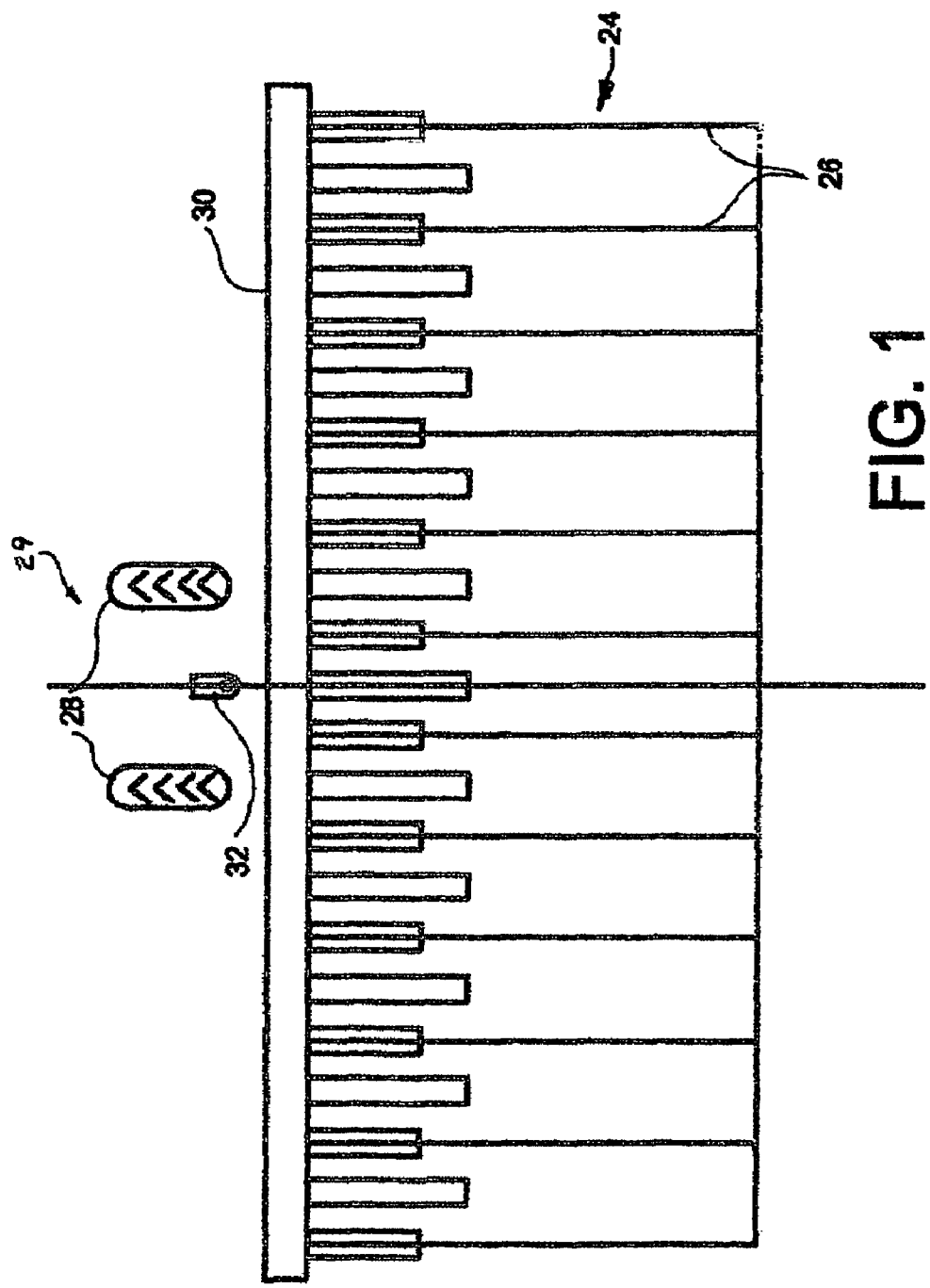
FIG. 1 is a top plan view of a farm field and the hitch in which the hitch is directly behind the tractor and in line with the old crop stubble rows.

FIG. 1 depicts an image of a field 24 with rows 26 (only two marked) of crop stubble from a previous harvest. There is also a depiction of tires 28 which is used herein to indicate the presence of a tractor or other source of motive power (and referred to hereinafter as tractor 29). An image of a planter (but this could be any agricultural equipment) 30 is also shown affixed to tractor 29 by hitch 32. This figure depicts the normal arrangement of equipment in use today.

Figure 2:
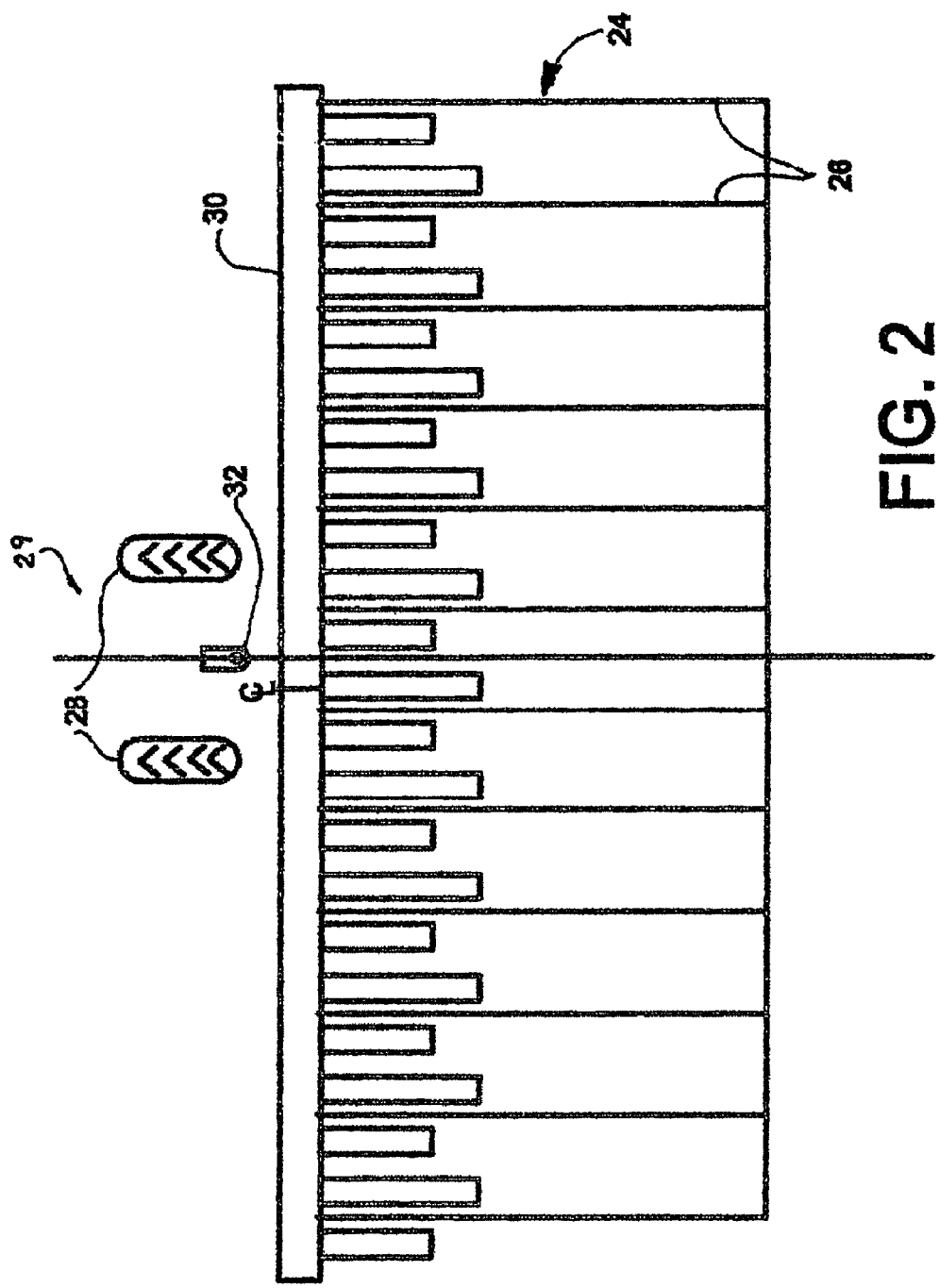
FIG. 2 is a top plan view of a farm field and a tractor using the hitch in which the hitch is offset from the old crop stubble rows.

FIG. 2 shows the planter 30 in use with the hitch 33 of the instant invention. As can be seen in FIG. 2 the planter 30 is offset from the crop rows 26. The hitch 33 is located between the tractor 29 and the planter 30. This figure clearly shows that with the offset hitch 33 in use that the planter 30 will not have to traverse the previous crop rows 26 to complete the planting. It is clearly shown here that the offset characteristic of hitch 33 provides a more satisfactory environment for the planter, since it will not be going directly over the crop rows and the crop stubble.

FIG. 1 depicts the least ideal situation which causes the most difficult condition for cultivation of the land. FIG. 2 clearly depicts the easiest method to accomplish the desired planting (or other agricultural) tasks.

FIG. 3A shows the offset hitch 33 in relative position generally as it would form a coupling between a tractor 29 and an implement. A large rectangular metal plate is the core stress-bearing component 12 and is positioned generally vertically to the ground. Two generally smaller metal plates 14 each containing a plurality of generally vertically aligned holes 16 are affixed to plate 12 are provided for attachment of the implement as by clevis pin 19 (pin not shown). Clevis 19 is adjustably attached between the plates 14 through the corresponding holes 16 and secured in the proper vertical position by bolts or other suitable removable attachment mechanisms. On the opposing side of the large rectangular plate 12 is another pair of metal plates 18 which are used to secure the hitch to the implement. Once the implement is secured to the offset hitch 33, the trailing implement is offset by the distance between the centerlines of the attachment plates, 14 and 18. The hitch, by way of manufacture may be installed with either a left or a right offset. (An offset of 7.5 inches to the left or right of the tractor is required for implements configured with 30 inch spaced main rows. A different dimension of offset will be required for implements of other configurations).

Figure 3B:
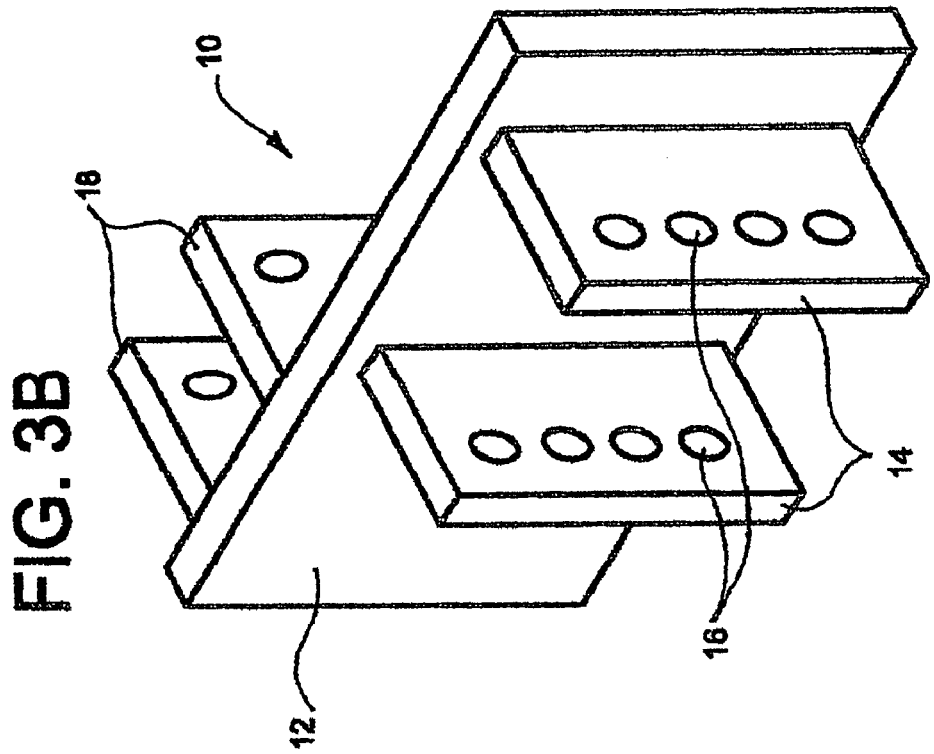
FIG. 3B is a front elevation perspective view of the main body of the hitch embodiment shown in FIG. 3A.
Figure 3C:
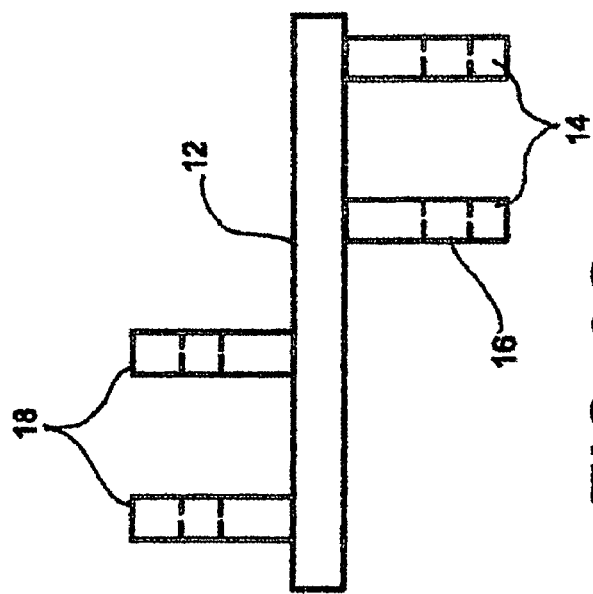
FIG. 3C is a top plan view of the hitch shown in FIG. 3B.

FIG. 3B shows a perspective view of the hitch 33 by itself, and FIG. 3C shows a top plan view of the hitch of FIG. 3B.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In a combination of a towed agricultural implement having a horizontal centerline and a forwardly extending draft tongue, and a hitch for connecting the implement tongue to a vehicle for towing the implement in a direction of travel, the vehicle for towing having a longitudinal centerline, the improvement comprising:

a first rigid generally planar and vertical plate having length, height and thickness dimensions, said length and height dimensions generally perpendicular to the direction of travel, said first plate having a first side in the direction of travel and an opposing second side, said first and second sides sharing said length and height dimensions;

a first pair of rigid generally planar and vertical spaced-apart plates affixed to said first side of said first plate and extending generally perpendicularly therefrom in the direction of travel, each of said spaced-apart plates making up said first pair of plates has a plurality of vertically aligned holes therethrough for vertically adjustably attaching the hitch to the towing vehicle;

a second pair of rigid generally planar and vertical spaced-apart plates affixed to said second side of said first plate and extending generally perpendicularly therefrom in a direction opposite the direction of travel, each of said spaced-apart plates making up said second pair of plates has a plurality of vertically aligned holes therethrough for vertically adjustably attaching the hitch to the implement; and said first pair of plates and said second pair of plates being offset one from the other along said length dimension of said first plate such that the centerline of the implement does not align with the longitudinal centerline of a towing vehicle, whereby the towing vehicle may follow previous crop rows with the implement being slightly offset of the previous crop rows.

2. The improvement of claim 1, wherein:

said offset is approximately 7.5 inches.

3. The improvement of claim 2, wherein:

said offset is approximately 7.5 inches, and the offset can be selectively changed from one side of the longitudinal centerline of the towing vehicle by flipping the hitch 180 degrees forwardly.

4. The improvement of claim 3, wherein:

said agricultural implement is a planter.

5. A hitch for connecting an agricultural implement having a horizontal centerline and a forwardly extending draft tongue to a vehicle for towing the implement in a direction of travel, the towing vehicle having a longitudinal centerline, the hitch comprising;

a first rigid generally planar and vertical plate having length, height and thickness dimensions, said length and height dimensions a primary dimension generally perpendicular to the direction of travel, said first plate having a first side in the direction of travel and an opposing second side, said first and second sides sharing said length and height dimensions;

a first pair of rigid generally planar and vertical spaced-apart plates affixed to said first side of said first plate and extending generally perpendicularly therefrom in the direction of travel, each of said spaced-apart plates making up said first pair of plates has a plurality of vertically aligned holes therethrough for vertically adjustably attaching the hitch to the towing vehicle;

a second pair of rigid generally planar and vertical spaced-apart plates affixed to said second side of said first plate and extending generally perpendicularly therefrom in a direction opposite the direction of travel, each of said spaced-apart plates making up said second pair of plates has a plurality of vertically aligned holes therethrough for vertically adjustably attaching the hitch to the implement; and said first pair of plates and said second pair of plates being offset one from the other along said length dimension of said first plate such that the centerline of the implement does not align with the longitudinal centerline of a towing vehicle, whereby the towing vehicle may follow previous crop rows with the implement being slightly offset of the previous crop rows.

6. The improvement of claim 5, wherein:

said offset is approximately 7.5 inches.

7. The improvement of claim 6, wherein:

the offset can be selectively changed from one side of the longitudinal centerline of the towing vehicle by flipping the hitch 180 degrees forwardly.

8. The improvement of claim 7, wherein:

said agricultural implement is a planter.

9. A hitch for connecting a tractor to an agricultural planter and towing it in a direction of travel, the hitch comprising:

a first rigid generally planar and vertical plate having length, height and thickness dimensions, said length and height dimensions generally perpendicular to the direction of travel, said first plate having a first side in the direction of travel and an opposing second side, said first and second sides sharing said length and height dimensions;

a first pair of rigid generally planar and vertical spaced-apart plates affixed to said first side of said first plate and extending generally perpendicularly therefrom in the direction of travel, each of said spaced-apart plates making up said first pair of plates has a plurality of vertically aligned holes therethrough for vertically adjustably attaching the hitch to the towing vehicle;

a second pair of rigid generally planar and vertical spaced-apart plates affixed to said second side of said first plate and extending generally perpendicularly therefrom in a direction opposite the direction of travel, each of said spaced-apart plates making up said second pair of plates has a plurality of vertically aligned holes therethrough for vertically adjustably attaching the hitch to the implement; and said first pair of plates and said second pair of plates being offset one from the other along said length dimension of said first plate whereby the tractor may follow previous crop rows with the implement being slightly offset of the previous crop rows.

10. The improvement of claim 9, wherein:

said offset is approximately 7.5 inches, and the offset can be selectively changed from one side of the longitudinal centerline of the towing vehicle by flipping the hitch 180 degrees forwardly.

\* \* \* \* \*